United States Patent
Bertoya et al.

[11] 3,779,649
[45] Dec. 18, 1973

[54] METHOD OF AND AN ELECTRO-OPTICAL SYSTEM FOR INSPECTING MATERIAL

[75] Inventors: Hastings Charles Maxim Bertoya; Donald Mackenzie Ross; Richard Anthony Brook; Anthony John Allnutt; Robert Ernest Semos, all of Kent, England

[73] Assignee: Sira Institute, Kent, England

[22] Filed: Dec. 10, 1971

[21] Appl. No.: 206,611

Related U.S. Application Data

[63] Continuation-in-part of Ser. No. 3,231, Jan. 15, 1970, abandoned.

[30] Foreign Application Priority Data
Jan. 17, 1969 Great Britain.................. 2,862/69

[52] U.S. Cl. .......... 356/200, 250/219 DF, 356/237
[51] Int. Cl...................... G01n 21/16, G01n 21/22
[58] Field of Search ............. 250/219 DF; 356/199, 356/200, 237–240

[56] References Cited
UNITED STATES PATENTS
3,612,702  10/1971  Troll................................. 356/200
3,280,692  10/1966  Milnes et al. ....................... 356/200

Primary Examiner—David Schonberg
Assistant Examiner—F. L. Evans
Attorney—Richard C. Sughrue et al.

[57] ABSTRACT

A method of, and system for, automatically inspecting a surface of material such as strip or sheet metal in order to detect flaws in the surface. The surface is moved beneath an optical scanner which receives light reflected from sequential parts of said surface. The reflected light is converted in an electrical waveform composed of a series of pedestals each corresponding to the reflectivity of a part of the surface representing one scan. An analogue comparison waveform is derived from each of the pedestals, by inter alia a special filtering operation and this waveform provides a reference by which the pedestals are examined for flaw indicative information. Various techniques are employed to assess the quality of the pedestals and to generally improve the validity of the flaw detecting operation.

20 Claims, 21 Drawing Figures

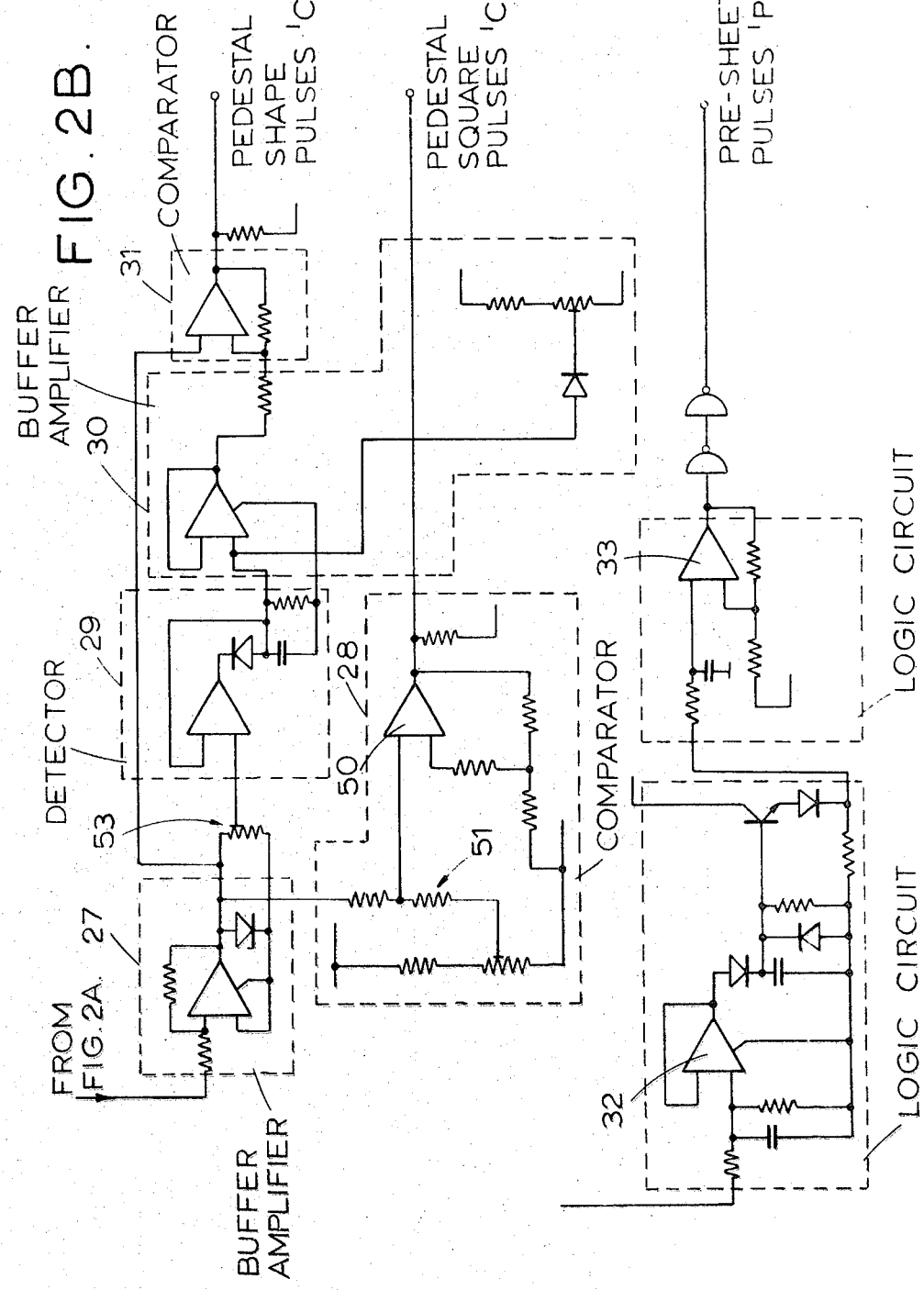

METHOD OF AND AN ELECTRO-OPTICAL SYSTEM FOR INSPECTING MATERIAL

CROSS REFERENCE TO RELATED APPLICATIONS

This application is a continuation-in-part of U.S. Pat. application Ser. No. 3231, filed Jan. 15, 1970, now abandoned.

BACKGROUND TO THE INVENTION

The present invention generally relates to a method of, and a system for, inspecting materials in order to detect surface or internal flaws or other characteristics. The invention is particularly, but not solely, concerned with material in the form of sheet or strip aluminum or copper.

It is known to inspect material automatically by collecting electromagnetic radiation affected by the presence of the material and converting the collected radiation into an electrical waveform which is subsequently processed to extract information concerning the material. The material under investigation may have radiation reflected from one of its surfaces and collected or else the collected radiation may be that transmitted through the material. In other cases the material may emit radiation itself, e.g., infra-red, or else the material can be excited into emission by an external source of radiation. In all cases the radiation influenced by the presence of the material can be directly converted into an electrical waveform containing information related to the particular characteristic under investigation. There are various known techniques for extracting this information.

A general object of this invention is to provide an improved material inspection system.

A further object of this invention is to provide an improved electronic system for processing an electrical waveform produced by material inspection equipment.

SUMMARY OF THE INVENTION

According to the invention there is provided a system for inspecting material having means for collecting electromagnetic radiation influenced by the presence of said material; means for producing a first electrical waveform dependent on said collected radiation; means for deriving a second electrical waveform having the same general shape as that of the first waveform but modified in respect of sudden transitions in said first waveform; and means for comparing the first and second waveforms to product a signal indicative of the characteristics of the material under investigation.

The second waveform can be an analogue waveform with a "peak level" in pre-determined relationship to the peak level of the first waveform.

Where the material is scanned sequentially the first waveform can be a series of square-wave pedestals each with a peak or top containing flaw-indicative information corresponding to a portion of the material.

The deriving means preferably includes a filter, more particularly a low-pass filter, and where the first waveform is a series of pedestals there can also be provided means for selectively altering, e.g., switching, the cut-off frequency of the filter to preserve the leading and lagging edges of the pedestals. The switched filter serves to preserve the rise and decay times of the leading and lagging edges of the pedestals, respectively, while removing high-frequency variations in the peak level thereof and smoothing any relatively rapid transition indicative of a flaw. This feature of a switchable filter is not necessary where the first waveform is composed of a single pedestal.

In another aspect the invention provides an electronic system for processing a first waveform composed of a series of square-wave pedestals produced by material inspection equipment to extract information contained in the top of the pedestals, the improvement comprising: a low-pass filter with an input for receiving the first waveform and an output producing a comparison waveform from each of the pedestals; means for altering the cut-off frequency of the filter from a higher value to a lower value just after the leading edge of each pedestal has occurred and from the lower value back to the higher value just before the lagging edge of each pedestal has occurred to thereby ensure that the leading and lagging edges of each pedestal are preserved in the associated comparison waveform; and means for comparing each pedestal with its associated comparison waveform to ascertain the presence of said information in the top of the pedestal.

In accordance with a preferred embodiment there is provided a system for inspecting a surface of material, said system including a source of electromagnetic radiation arranged to direct radiation onto said surface. Means is provided for scanning the surface in sequential parts as the surface is moved to collect radiation reflected from said surface. The collected radiation is converted by a photosensor or the like into a waveform in the form of a series of pedestals each indicative of the reflectivity of the part of the surface covered by one scan. A means is adapted to receive the pedestals and to produce an analogue comparison waveform from each pedestal, said comparison waveform having the same general shape as the associated pedestal and being modified in relation to its associated pedestal in respect of sudden transitions representing flaw indicative information in the top of the latter. The system has means for comparing each comparison waveform with its associated pedestal to ascertain whether there are any transitions in the top of the pedestal indicative of flaws in said surface.

The pedestals are essentially in the form of square-wave pulses and in the reflection mode of operation the presence of a flaw in the surface will cause the radiation to be absorbed, scattered or reflected away from the specular direction. This in turn will usually cause a rapid transition in the top of the corresponding pedestal which transition itself has a peak or trough which is greater or less than the peak level of the pedestal itself. In the latter case the aforesaid device may inter alia attenuate a pedestal to produce a comparison waveform with a "peak level" less than the "peak level" that of the pedestal itself. In the former case the device may amplify a pedestal to produce a comparison waveform with a "peak level" greater than that of the pedestal itself.

In other applications the radiation need not be reflected from the material under investigation. It could, for example, be transmitted through the material and the collected radiation converted to the waveform and processed as described.

The comparison means may produce a pulse the duration of which is proportional to the duration of time that a transition from the "peak level" of one of the pedestals containing said information differs from the corresponding part of the "peak level" of the associated comparison waveform. In order to assess the duration of the electrical pulse to thereby determine, for example, the dimension of the flaw giving rise to the pulse, the leading edge of the pulse can be used to initiate the generation of clock pulses which ceases operation when triggered by the lagging edge of the pulse, A counter can then be used to count the number of pulses produced by the clock pulse generator.

The system preferably includes means to improve the validity of the flaw detecting operation by constantly assessing the quality of the pedestals.

The invention may be understood more readily, and various other features of the invention may become more apparent, from consideration of the following description.

BRIEF DESCRIPTION OF DRAWINGS.

A constructional embodiment of the present invention will now be described, by way of example only, with reference to the accompanying drawings, wherein.

DESCRIPTION OF PREFERRED EMBODIMENT

The electro-optical system will now be described in conjunction with the accompanying drawings.

Figure 1:
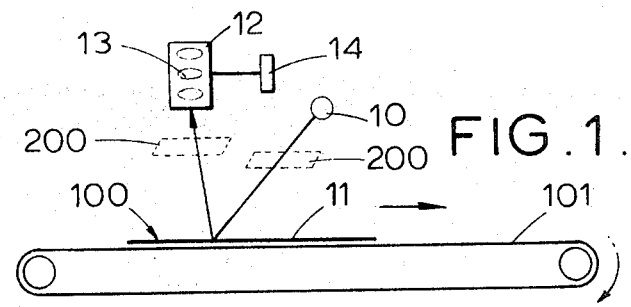
FIG. 1 is a schematic diagram depicting one form of scanning device for an electro-optical system made in accordance with this invention.
Figure 2A:
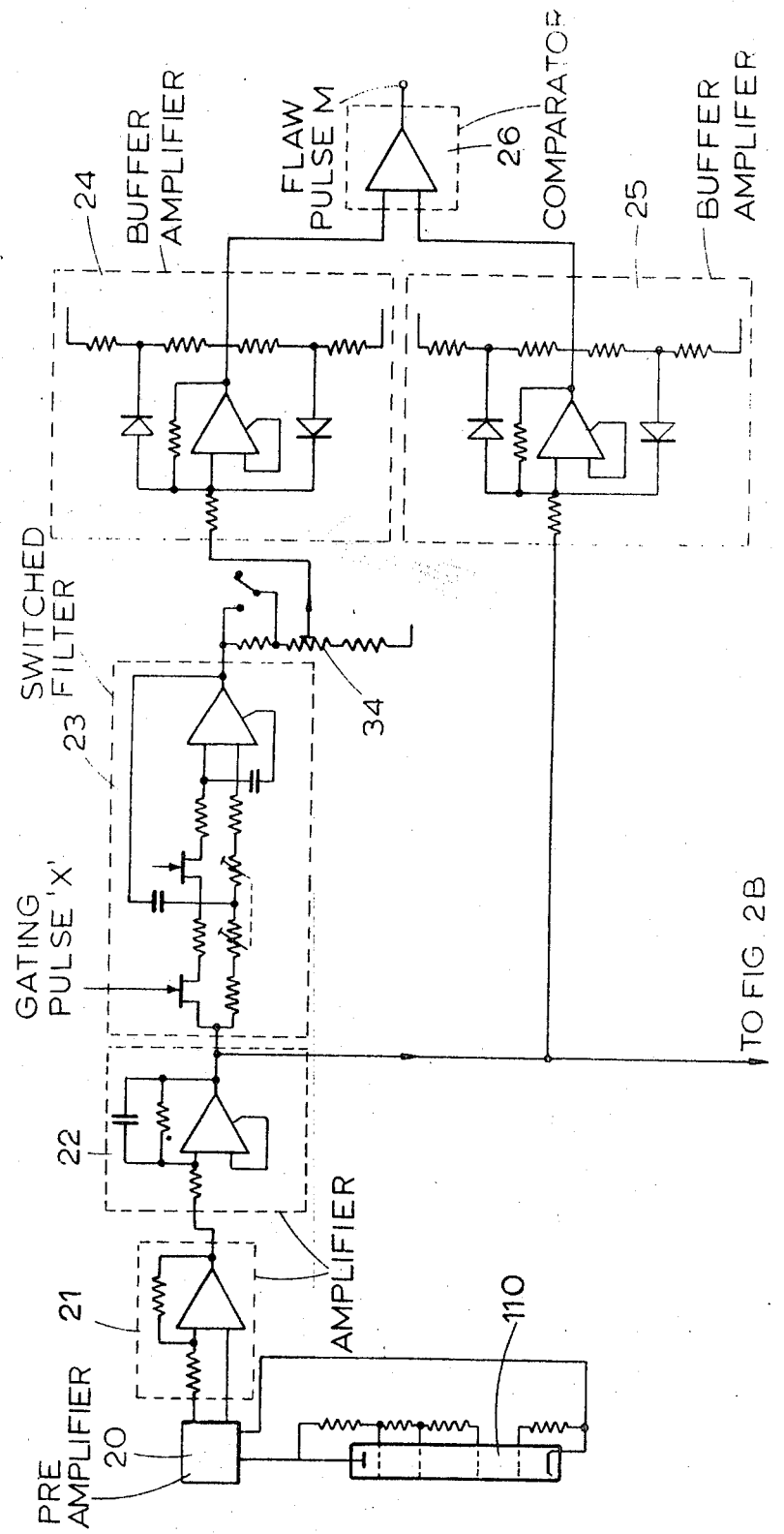
FIG. 2 composed of FIGS. 2A and 2B is a part schematic and part circuit diagram of certain parts of the system.

As shown in FIG. 1, a source of light 10, which can conveniently be one or more fluorescent tubes is disposed generally above a moding upper surface 11 of the material 100 to be examined. The material 100 will normally be in the form of a straight-edge lamellar body such as a sheet or strip conveyed along a conveyor belt 101, for example, and a number of sheets or a continuous strip can be examined by the system. The light emitted from the source 10 is reflected in a specular manner from the surface 11 and the reflected light is directed at a scanning device in the form of a scanning head 12. The scanning head 12 is basically in the form of a drum having a number of, e.g., eight, scanning lenses 13 arranged around its peripheral surface. The drum is rotated at constant speed by means of a motor 14. The material can be moved at up to about 450 feet per minute and the drum rotated at about 2,800 r.p.m. during operation of the system. When one of the lenses 13 is passed across the light beam reflected from the surface 11 the reflected light is focussed by the lens onto a small transparent slit (not shown) disposed within the drum. The slit can be in the order of 6 thousandths of an inch wide by 20 thousandths of an inch long. As the drum is rotated an image of the illuminated surface 11 is moved across the slit. The light passed through the slit is a function of the reflectivity of the surface 11 over the scanned part thereof. The light passed through the slit is collected by a suitable optical arrangement and detected with a photo multiplier 110 (FIG. 2A). The resultant electrical signal consists of a series of d.c. pulses at constant repetition rate referred to throughout this specification as pedestals, each corresponding to a scan made by one of the lenses 13. The pedestals are amplified and fed to further analysing circuitry as described hereinafter.

Figure 17:
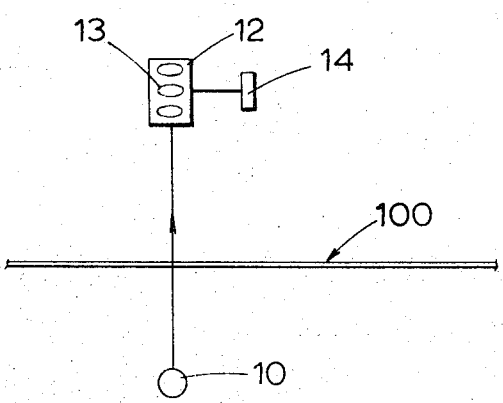
FIGS. 17 and 18 are schematic diagrams depicting alternative arrangements of scanning devices.

Instead of arranging for light to be reflected from the material under test light-transmitting materials can be analysed by the arrangement shown in FIG. 17. In FIG. 17 like reference numerals denote like parts to those depicted in FIG. 1. In contrast to FIG. 1 the light source 10 in FIG. 17 is disposed on the opposite side of the material 100 so that the scanning device collects light transmitted through the material 100.

Figure 18:
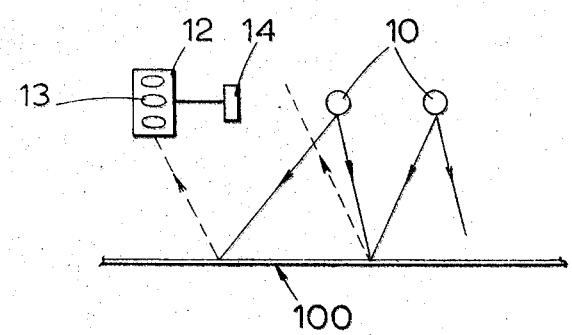

Another arrangement is depicted in FIG. 18 where again like reference numerals denote like parts to those shown in FIG. 1. In FIG. 18 the material 100 is of such nature that it emits radiation, possibly light, which is collected by the scanning device. By way of example radiation sources 10 are used to excite the material 100 into emission but depending upon the material 100 the excitation sources may not be necessary.

The preferred form of scanning device, i.e., the rotatable drum, is not essential to the invention and other forms of scanning device can be used. Whatever form of scanning device is used radiation influenced by the material under test is collected and converted into an electrical waveform. In the cases mentioned the waveform would be composed of a series of pedestals but it is possible for the waveform to be composed of a single pedestal instead of a plurality of pedestals. Thus although reference is made hereinafter to a plurality of pedestals it is to be understood that the teaching of the invention can be applied to a single pedestal.

Generally speaking, for an ideal material the pedestals would be in the form of square wave pulses. Should flaws occur in the material then certain irregularities occur in the peak or top of a pedestal where, for example, the instantaneous voltage may fall suddenly. The duration of the irregularity, e.g., fall-off, in voltage is an indication of the dimensions of the flaw.

Figure 5:
FIGS. 5 to 16 illustrate various waveforms which occur in the system.
Figure 6:
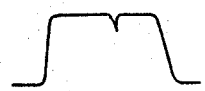
Figure 7:

FIG. 5 shows a series of pedestals which would be produced by an ideal surface analysed by the FIG. 1 arrangement. FIG. 6 shows the effect that a flaw in an ideal surface would have on one of the pedestals and FIG. 7 shows a more realistic pedestal as might be produced by a surface containing a flaw. For convenience this latter pedestal will be considered as that produced for analysis.

As shown in FIG. 2A, the pedestals (FIG. 7) taken from the photomultiplier 110 are fed to cascaded amplifiers 20, 21 and 22 of which amplifier 20 is a preamplifier. The output from the amplifier 22 is fed to a filter 23. Where a series of pedestals are to be processed to extract flaw-indicative information the filter 23 is switched so that its cut-out frequency is changed during the time interval of the pedestal and this can best be appreciated by considering FIGS. 8 and 9.

Figure 8:
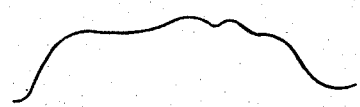
Figure 9:
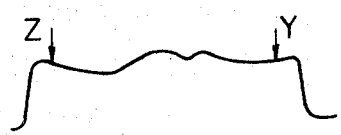

FIG. 8 shows the result of passing one of the pedestals through a low-pass filter of constant cut-off frequency. As shown the leading and lagging edges of the pedestal are effectively lost due to the long-time constant of the filter. Some kind of special low pass filter is desired which can be switched from a shorter time constant and a higher cut-off frequency to a longer time constant and a lower cut-off frequency after the leading edge of the pedestal has been passed. Just before the lagging edge of the pedestal the filter should be switched from the longer time constant to the shorter time constant in order to pass the lagging edge largely unaltered. By this measure any variations on the top of the pedestal will be smoothed while the general shape of the pedestal is preserved. The effect of such a special filter is shown in FIG. 9 where the points Z and Y denote when the filter is switched from the higher cut-off frequency to the lower cut-off frequency and vice versa. The filter 23 is preferably switched automatically and this can be achieved by producing gating pulses denoted X in FIGS. 3 and 4. The gating pulses X in the system are derived from the pedestals and this gives rise to an advantageous feature of the invention, namely that the position of the individual sheets or strip on the conveyor belt does not matter. Hence it is not necessary to arrange the sheets or strip in any predetermined position. Also the width of the sheet or strip does not matter and sheets of various widths can be examined successively if desired.

To produce the gating pulse X pedestal square pulses are produced. To this end as shown in FIG. 2B the output of the amplifier 22 is fed through a buffer amplifier 27 to a comparator 28. The comparator 28 incorporates an active amplifier 50 used as a d.c. adder with two inputs. In general the pedestals are fed to one of these inputs and a d.c. comparison voltage is fed to the second of these inputs. The output from the amplifier 50 produces the pedestal square pulses denoted C. The d.c. voltage fed to the second input of the amplifier 50 is effectively compared with each pedestal at the first input.

Figure 10:
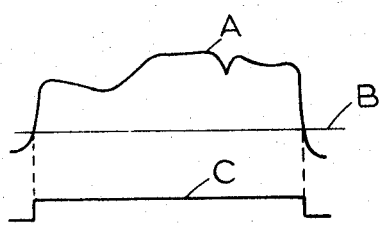

In the particular arrangement depicted in FIG. 2B a resistive network, generally designated 51, produces a d.c. voltage of opposite polarity to the pedestals. This voltage is added to the pedestals before the pedestals are applied to the first input of the amplifier 50. The second input of the amplifier 50 is then set to zero. This particular arrangement is used to protect the amplifier 50 from being damaged or destroyed should the voltage difference between its inputs exceed the rating specified for the amplifier 50. A general relationship between the first and second inputs and output of the amplifier 50, referred to as the pedestal square pulse C, for one pedestal is shown in FIG. 10. Although it is to be understood that these relationships do not correspond to the actual relationships for the particular safety arrangement shown in FIG. 2B, but rather to the general principle of comparing a d.c. voltage with a pedestal. In FIG. 10 the reference A denotes the first input, i.e., a pedestal, the reference B denotes the second input, i.e., a d.c. voltage and the reference C denotes the output, i.e., the pedestal square pulse.

Figure 11:
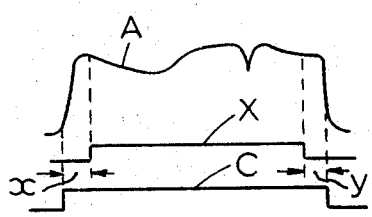

Each pedestal square pulse C must be modified to provide the corresponding gating pulse X used to switch the cut-off frequency of the filter 23 for each pedestal. The relationship between one gating pulse X, the corresponding pedestal square pulse C and the corresponding pedestal A is shown in FIG. 11 where A again denotes the pedestal, X denotes the gating pulse and C again denotes the pedestal square pulse.

Figure 3A:
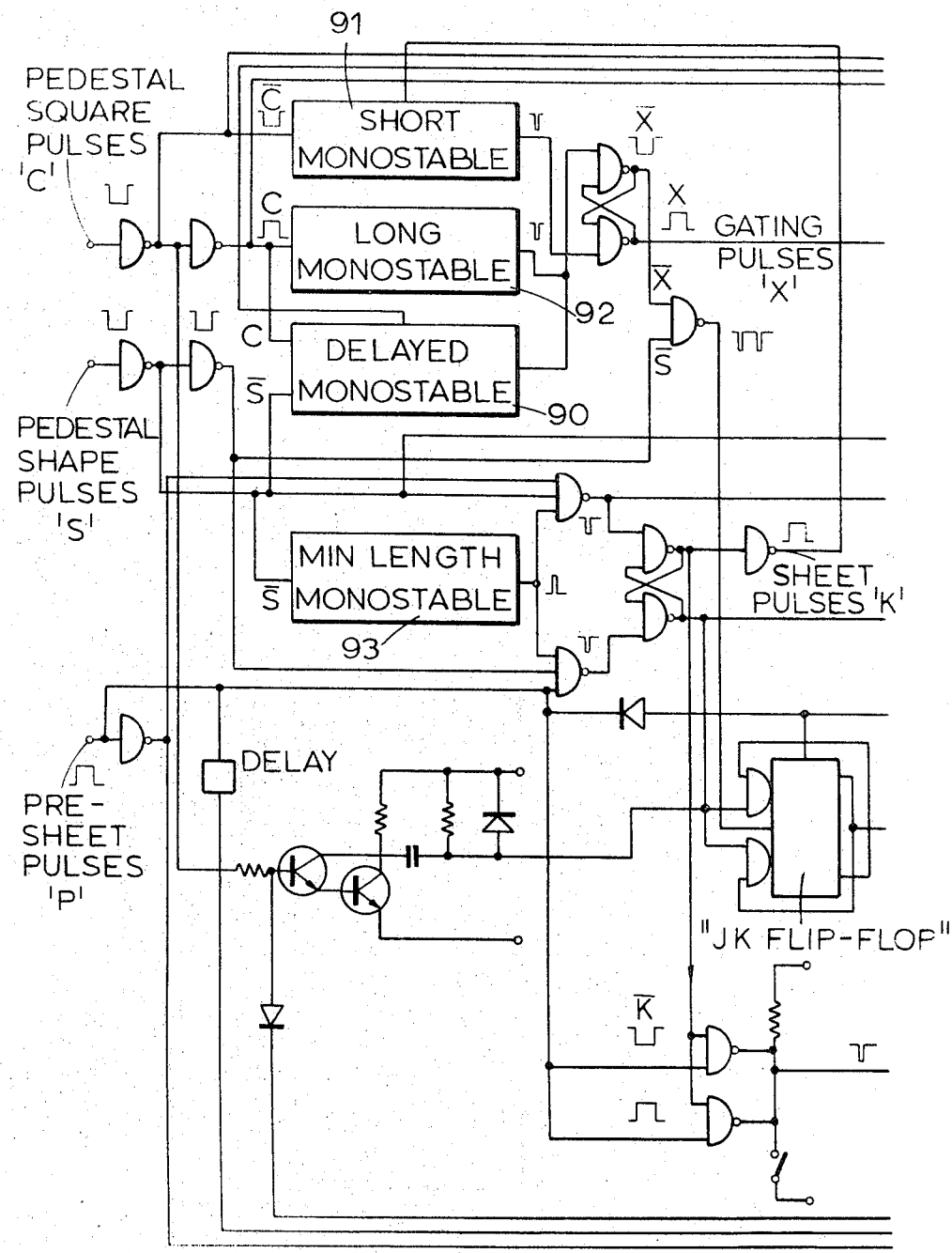
FIG. 3 composed of FIGS. 3A and 3B is a logic block diagram illustrating further parts of the system and the paths of various waveforms in the system.
Figure 3B:
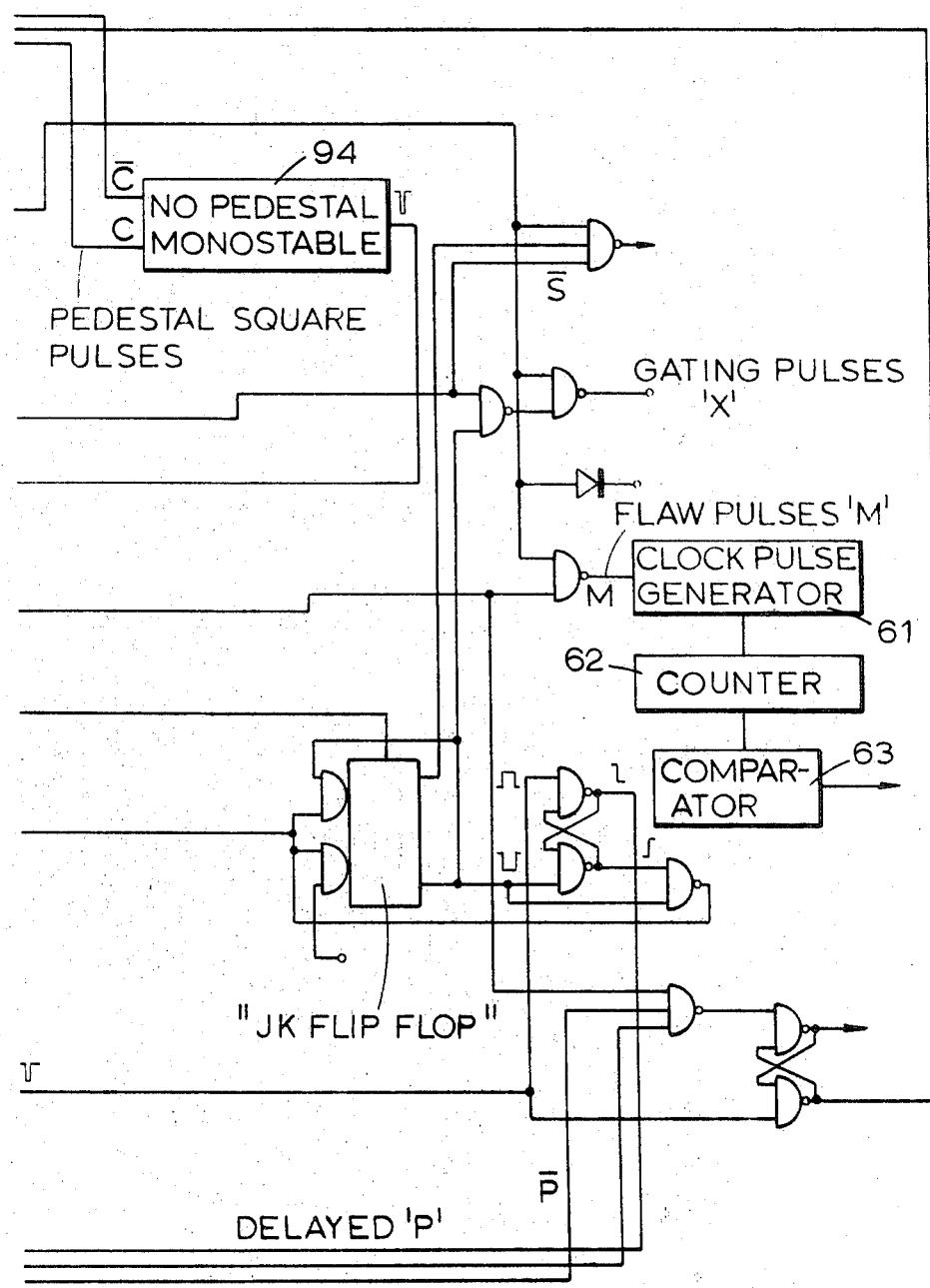
Figure 4A:
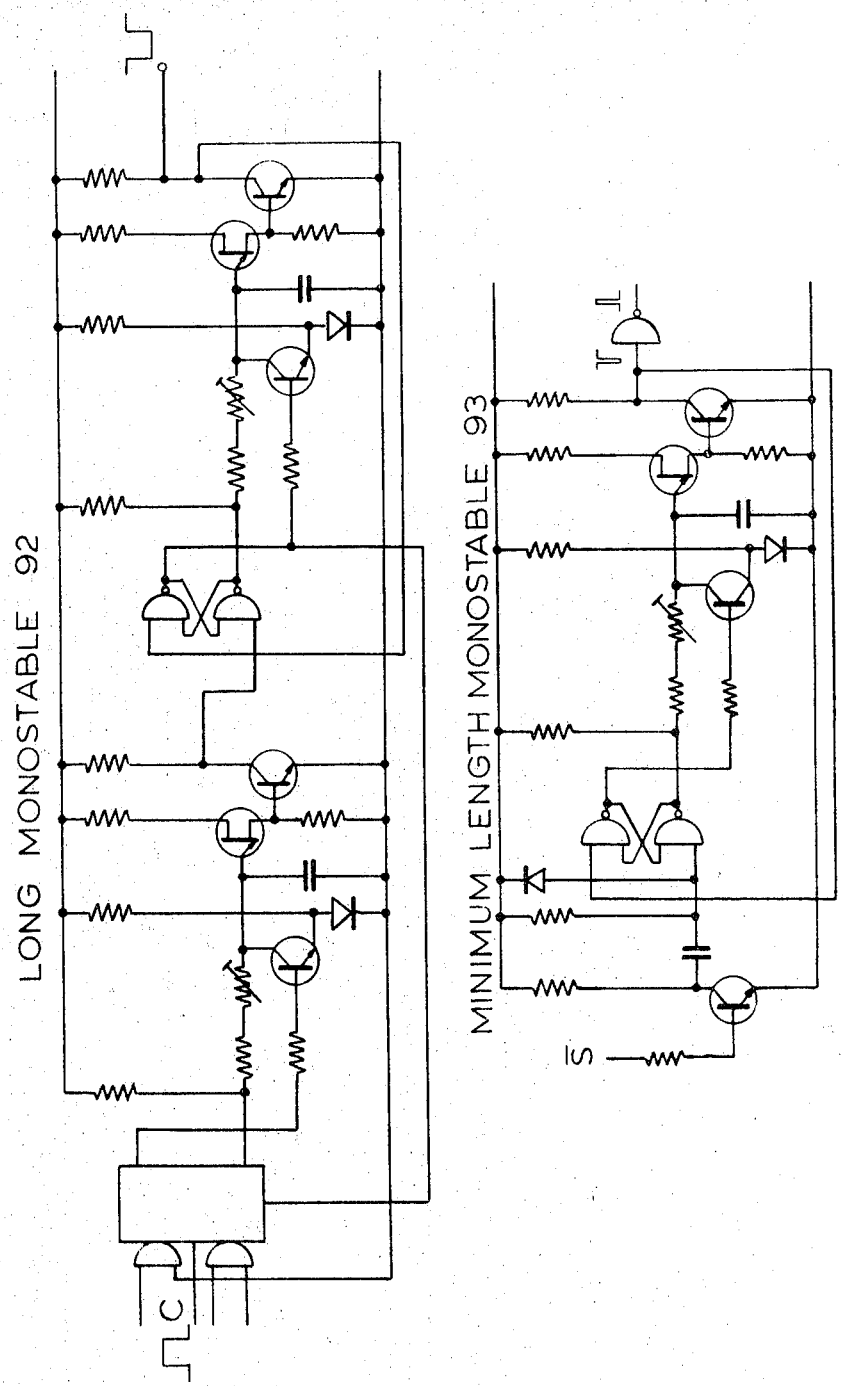
FIG. 4 composed of FIGS. 4A and 4B is a part schematic and part circuit diagram of various monostable devices used in the parts of the system depicted in FIG. 3.
Figure 4B:
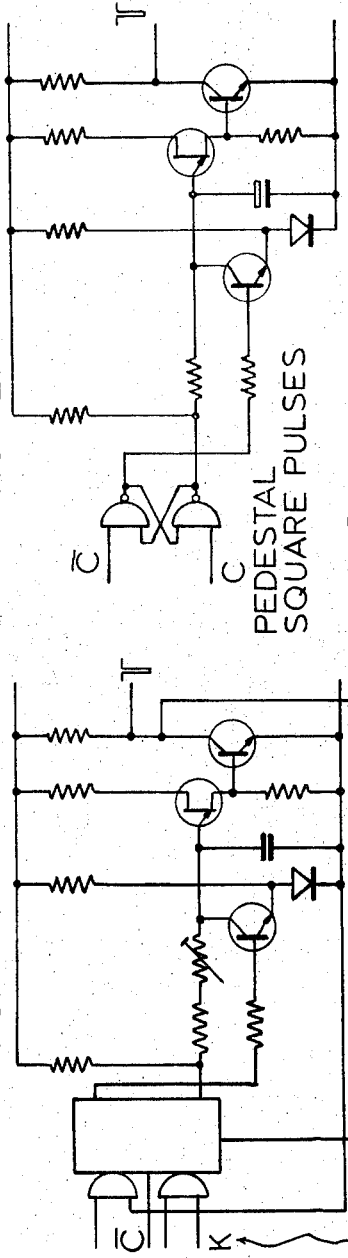
Figure 4B:
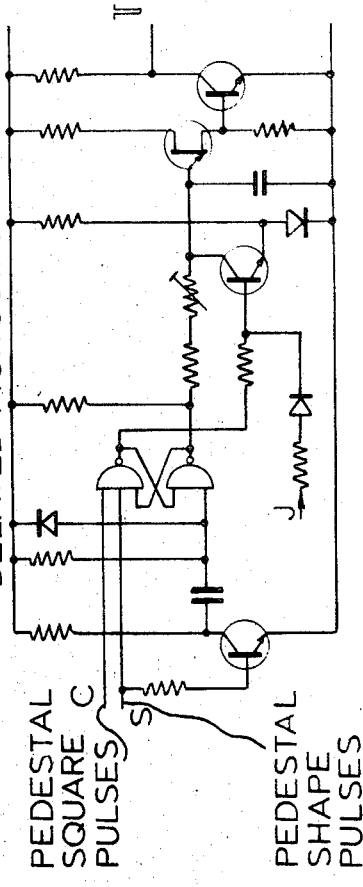

The derivation of the gating pulse X is depicted in FIGS. 3 and 4. The delay $x$ between the start of the pedestal square pulse C and the start of the corresponding gating pulse X can be achieved by means of a monostable device 91 denoted "short monostable" (FIG. 3A and 4B) which is controlled by a sheet pulse K (FIG. 3A) present when correct scanning is taking place. The delay $y$ between the end of the pedestal square pulse C and the end of the corresponding gating pulse X can be achieved by using another slit in the scanning drum to provide a further special pedestal slightly ahead in time from the basic pedestal. However, a more convenient way of achieving the delay $y$ is to produce the lagging edge of the gating pulse X by triggering from a delay initiated by the lagging edge of the pedestal preceding the one in question. This delay is achieved by a monostable device 92 denoted "long monostable" (FIGS. 3A and 4A). This delay will be constant, as is desirable, because the pedestal repetition rate is constant. As mentioned before the gating pulses X are used to switch the cut-off frequency of the filter 23.

Figure 12:
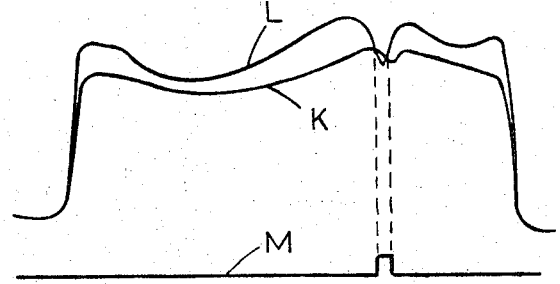

The presence of flaws in the pedestals is detected as follows:

As shown in FIG. 2A, the output from the filter 23 is attenuated in an attenuator 34 to produce an analogue comparison waveform which is fed to a buffer amplifier 24. An unfiltered version of the output from the amplifier 22 is fed to a similar buffer amplifier 25. The outputs from the buffer amplifiers 24, 25 are fed to a comparator 26. The inputs and output of the comparator 26 for one pedestal are depicted in FIG. 12. The first input to the comparator 26, i.e., the unfiltered pedestal is denoted by L and 'L' is also the output of amplifier 25, the second input to the comparator 26, i.e., the comparison waveform, is denoted by K and 'K' is also the output of amplifier 24. The output of the comparator 26 is denoted by M. By this arrangement an attenuated filtered version of each pedestal (waveform K) is effectively subtracted from the pedestal itself (waveform L) to produce the output M. The output M of the comparator 26 is a logic pulse referred to as a flaw pulse and is indicative of the presence of a flaw in the material surface. The presence of oil or similar matter on the surface being analysed or slight irregularities in the optical alignment of the apparatus are likely to cause only slow changes in the top of the level. Thus these changes would be present on both waveforms L and K and will not be detected as flaws. The waveform K is effectively an attenuated average of waveform L over a proportion of the scan. The ratio of the instantaneous voltages or the peak level, as hereinbefore defined, of waveforms L and K is equal to a factor $\mu$ which is set according to the sensitivity required of the system. generally the factor $\mu$ will be less than unity and is defined by the attenuator 34 but in some applications where flaws in the surface being examined would give rise to transitions which represent an increase in the peak level of the pedestals the attenuator 34 would be replaced by an amplifier and the factor $\mu$ will be greater than unity.

In an alternative treatment the peak level of waveform K is arranged to be substantially the same as the peak level of waveform L so that the factor $\mu$ is 1. The waveforms L and K are subtracted and fed to one input of a comparator. A second input from the comparator is derived from the waveform K and is preferably an attenuated version of the waveform K. This is desirable since the first input to the comparator will be a relatively small voltage.

A clock pulse generator 61 (FIG. 3B) having a frequency of 4MHz is triggered by the leading edge of the logic pulse M when the latter occurs during the presence of one of the gating pulses X. The clock pulse generator 61 runs until the lagging edge of the same logic pulse M causes it to cease. The number of clock pulses produced by the clock pulse generator corresponds to the width of the logic pulse M and hence the dimension of the flaw in the material. The gating pulses X are used to inhibit the operation of the clock pulse generator 61 during the interval between successive pedestals.

A counter 62 (FIG. 3B) initially set to zero, can be used to count the number of pulses produced by the clock pulse generator 61 for each surface being analysed. The counter output can be compared with a pre-determined number in a digital comparator 63 (FIG. 3B) so that when the counter output exceeds the pre-determined number the comparator delivers an alarm signal used, for example, to energize an indicator lamp or operate a rejecting mechanism, and thus, material can be inspected automatically for flaws.

Figure 13:
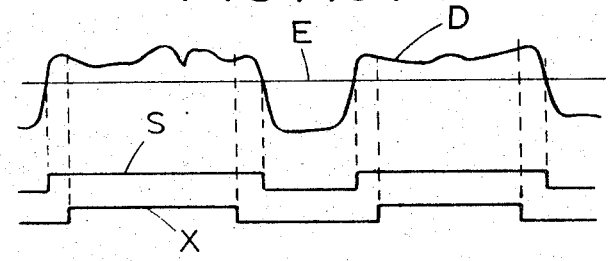
Figure 14:
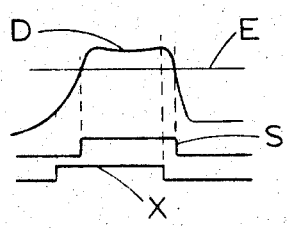

The shape of the pedestals may be much more distorted than that shown in FIG. 7 and also the mean amplitude of the pedestals may vary especially when the scanning lines are not parallel with the ends of the sheet. Some criterion by which acceptable pedestals can be judged is therefore needed. To this end as shown in FIG. 2B the output from the buffer amplifier 27 is attenuated in an attenuator 53 by a certain factor; about 50–75 percent dependent upon the levelness of the pedestal top. This attenuated pedestal is peak detected in a circuit 29 to form a d.c. voltage which is fed through a buffer amplifier 30 to a first input of a comparator 31. The comparator 31 has a second input which receives the main output from the amplifier 27 which of course, is the unattenuated pedestal. The output from the comparator 31 is a further logic pulse waveform referred to as the pedestal shape pulses S. The relationship between the inputs and the output of the comparator 31 and the gating pulse X for one pedestal is shown in FIG. 13 where D denotes the second input to the comparator 31 in the form of a pedestal indicating a normal scan without a flaw, E denotes the first input to the comparator 31, i.e., the d.c. reference level proportional to the peak value of the waveform D, S denotes the output of the comparator 31, i.e., the pedestal shape pulse and X denotes the gating pulse, shown also in FIG. 11. The duration of each pedestal shape pulse S indicates the time that the pedestal is above a certain factor of its peak level, and so long as this duration is greater than the duration of the corresponding gating pulse, as depicted in FIG. 13, then the pedestal is acceptable. FIGS. 3A and 4A depict inter alia a minimum length monostable device 93 sensitive to the presence or absence of the pedestal shape pulse S which together with the other logic circuits is designed to access the acceptability of the pedestals as represented in FIG. 13. The pedestals depicted in FIG. 13 have well-defined leading and lagging edges, this may not always be the case and FIG. 14 shows the relationship between the waveforms of FIG. 13 with a pedestal having a badly defined leading edge. The leading edge of the pedestal shape pulse S now occurs later than the leading edge of the corresponding gating pulse X and the gating pulse X does not lie wholly within the pedestal shape pulse S as was the case in FIG. 13. Conversely if the lagging edge of the pedestal was sloping then the lagging edge of the pedestal shape pulse S would occur earlier than the lagging edge of the gating pulse X.

Figure 15:
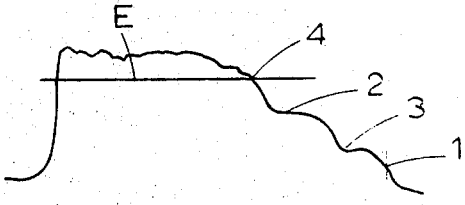
Figure 16:
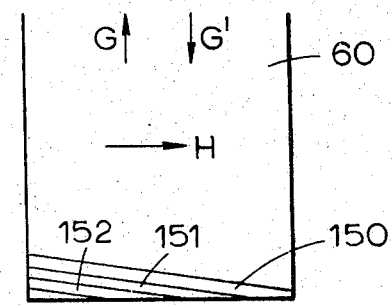

Even then the situation depicted in FIG. 14 is still somewhat idealized and the more irregular the shape of the pedestals become the more likely the equipment will register spurious information. A pedestal likely to give such false information is illustrated in FIG. 15, where the ragged lagging edge corresponds to one of the edges of the sheet being inspected. The reference E again denotes the d.c. reference level for producing the pedestal shape pulse S. The point 1 is where the gating pulse X for switching the filter 23 ends and consequently at this point the cut-off frequency of the filter 23 will be switched from a low to a high value. The points 2 and 3 are where the irregularities in the pedestal waveshape would be interpreted as flaws. This situation is most likely to be produced at the lagging or leading ends of the sheet being analysed. This situation and the means to combat this problem can be best appreciated from considering FIG. 16 where 60 denotes the sheet being analysed; G denotes the direction of motion of the sheet so that the end in question is lagging, G' denotes the direction of motion of the sheet so that the end in question is leading and H denotes the scanning direction. In FIG. 16, the scanning line 150 is a normal scanning line extending from one edge of the sheet to the opposite edge. In contrast, the scanning lines 151, 152 scan from the one edge of the sheet to the leading or lagging end of the sheet. In this example the scanning lines are shown to be closely adjacent one another but this may not always be so. The width of the lines can be in the region of 0.2 inches. As shown the scanning lines 151, 152 are shorter than the normal scanning lines and may cause misoperation of the flaw detecting circuits therefore special measures are necessary to cope with scanning of the leading and lagging ends of the sheet where false information may be detected. The scanning lines 151, 152 might well produce the pedestal depicted in FIG. 13 with an ill defined edge. In one example, the pedestal square C and pedestal shape S pulses are used to determine the gradient of the lagging edges of the pedestals. If the duration between the lagging edges of the pedestal shape pulse S and the corresponding pedestal square pulse C is greater than a pre-determined value a signal is generated to prevent misoperation of the circuits by means of a delayed monostable device 90 (FIGS. 3A and 4B).

To prevent malfunctioning at the leading and lagging ends of the sheet a photodiode (not shown) is mounted in the scanning head in a position close to the slit and slightly in front of the slit so as to receive light in advance of a scanning line. The photodiode receives a proportion of the reflected light passed through each of the lenses 13 and the output from this photodiode is amplified and fed to logic circuits 32 and 33 (FIG. 2B) which convert the signal to a logic pulse waveform known as the pre-sheet pulses P. The start of each pre-sheet pulse P occurs just prior to the proper scanning and the pulse P is used to re-set the circuits as depicted in FIG. 3A so that the sheet can be correctly analysed. When the lagging end of the sheet is reached the photodiode receives this information slightly earlier than the remaining circuits and this provides a warning signal to inhibit the circuits from registering false information.

In an alternative arrangement not shown in the drawings, two narrow beams of light are directed onto the sheet both just before and just after the scanning line relative to the direction of movement of the sheet. The light reflected by the sheet and originating from these narrow beams is allowed to activate four detectors and each detector must receive its associated reflected light otherwise the system is inhibited from registering information.

To further offset the danger of false detection when scanning near the ends of the sheet the scanning lines near the ends of the sheet are deliberately made of a lower sensitivity to the main part of the sheet. This can be achieved by switching the cut-off frequency of the filter 23 earlier than it would have been switched by the gating pulse X and this can be brought about for example by switching the filter with the corresponding pedestal shape pulse S. The filter 23 can thus be switched at the point 4 in FIG. 15 so as to inhibit the rough lagging edge of the pedestal from being detected as a flaw or flaws. Any large sudden drop in voltage will however still be detected, correctly, as a flaw. The switching of the filter 23 by means of the pedestal shape pulse S, i.e., the inhibiting of the gating pulse X, ceases when the pedestals become steep sided, such as in FIG. 11, indicating that the scanning lines are correctly proceeding from one side edge of the sheet to the opposite side edge as is the case with scanning line 150 in FIG. 16.

The situation could occur that the ends of the sheet were steeply inclined relative to the scanning lines as is shown in FIG. 16 and thus shortened pedestals would be produced. To offset this problem it is arranged that the duration of each of the pedestal shape pulses S must be greater than a minimum value otherwise the system is inhibited from detecting flaws. The minimum length monostable device 93 (FIGS. 3A and 4A) is used to perform this function.

When the leading edge of the sheet is detected by the advance photodiode to produce the pre-sheet pulse P the system is rendered ready for operation. The system is inhibited however until the duration of the pedestals become greater than the minimum specified value. At this point the circuits for providing the gating pulses X and for analysing the steepness of the edges of the pedestals are rendered operative by inter alia the device 93. As soon as the edges are sufficiently steep the system operates normally until the lagging end of the sheet is almost reached. The advance photodiode then alerts the system that the lagging end has been reached since the pre-sheet pulse P is absent and the system is inhibited in a somewhat analogous manner to when the leading edge was detected.

If the sheet being examined is disposed with its ends parallel to the scanning lines then the last pedestal received would have a duration longer than the minimum value and the inhibiting function will not take place. As shown in FIG. 3B, a monostable device 94 receives inputs indicative of the presence or absence of the pedestal square pulses C and is effectively inhibited by the presence of pedestals and is allowed to run during the absence of pedestals. This monostable device 94 referred to as the "no pedestal monostable" has a running time equal to the duration of about three pedestals. The re-setting of the monostable device 94 produces a signal which is used to prevent the system from registering, as does the normal recognition of the end of the sheet, i.e., a short length scan, detected by the device 93 until the next sheet again energizes the advance photodiode.

In some applications it may be desirable to prevent oil stains or films or similar foreign substances on the surface of the sheet under examination from being registered as flaws. Since oil is a dielectric substance the light reflected from it at certain angles of incidence can become plane polarized. If this is arranged then means can be provided for effecting selective absorption of certain polarized components of the reflected light, or even of light of particular wavelengths prior to activation of the photomultiplier 110 in order to distinguish between light reflected from dielectrics and light reflected from metals. The means can be a polarizing device or medium arranged either before or after the light is reflected or both. By way of example FIG. 1 depicts theuse of polarizing devices 200 disposed to intercept the light before and after reflection from the surface 11. In this way or in similar ways changes in reflection due to dielectric substances may be prevented from actuating the flaw detecting part of the system.

We claim:

1. In a system for inspecting material having means for collecting electromagnetic radiation influenced by the presence of said material and means for producing a first electrical waveform dependent on said collected radiation the improvement comprising: means for deriving a second electrical waveform having the same general shape as that of the first waveform but modified in respect of sudden transitions in said first waveform; and means for comparing the first and second waveforms to produce a signal indicative of the characteristics of the material under investigation.

2. A system according to claim 1, wherein said deriving means includes a filter.

3. A system according to claim 2, wherein the filter is a low-pass filter.

4. In a system for inspecting material having means for collecting electromagnetic radiation influenced by the presence of said material and means for producing a first electrical waveform dependent on said collected radiation; said first waveform being in the form of a series of square wave pedestals each having a top containing information indicative of the characteristics of the material under investigation; the improvement comprising:
   means for deriving a second electrical waveform composed of a series of square wave pedestals each having the same general shape as an associated pedestal of the first waveform but being modified in respect of sudden transitions in the top of said associated pedestal constituting said information; and
   means for comparing the first and second waveforms to ascertain the presence of said information in the first waveform.

5. A system according to claim 4, wherein said deriving means includes a filter.

6. A system according to claim 5, wherein said filter is a low-pass filter and there is further provided means for selectively controlling the cut-off frequency of said filter during the period of each pedestal.

7. A system according to claim 4, wherein the comparison means produces a signal whenever information indicative of flaws in the material is present in the first waveform and there is further provided means for providing a digital indication of the total duration of said comparison means signal.

8. A system according to claim 7, wherein said digital indication providing means is composed of a source of regularly recurrent timing pulses, a counter and means for controlling the flow of timing pulses to the counter in accordance with the comparison means signal.

9. A system according to claim 4, wherein the deriving means produces a second waveform which has a peak level which is substantially the same as the peak level of the associated pedestal and the comparison means produces an electrical pulse having a time duration proportional to the duration of time that a transition from the peak level of one of the pedestals containing said information differs from the corresponding part of the peak level of the associated comparison waveform.

10. A system according to claim 4, and further comprising means for automatically assessing the quality of each of the pedestals by examining each pedestal in respect of a number of specific features and means for inhibiting the system from operating should any of said features fall below a pre-determined standard.

11. A system according to claim 4, wherein the material is in the form of a sheet one surface of which is subjected to inspection and there is provided means for detecting the presence of the terminal ends of the sheet and moves sensitive to said detecting means for inhibiting the system from operating when radiation is collected adjacent said ends.

12. A system according to claim 4, wherein there is provided means for selectively removing polarized components of the radiation prior to collection by said collection means.

13. A system according to claim 4, wherein there is provided at least one attenuating means for attenuating at least one of the first and second waveforms to establish a pre-determine relationship between the peak levels of the associated pedestals of the first and second waveforms.

14. A system according to claim 13, wherein said at least one attenuating means is manually adjustable.

15. In a system for inspecting material having means for collecting electromagnetic radiation influenced by the presence of said material and means for producing a first electrical waveform from the collected radiation; the improvement comprising:
means for deriving an analogue comparison waveform from said first waveform, the comparison waveform having the same general shape as the first waveform with a peak level in predetermined relationship to the peak level of the first waveform; and
means for comparing the comparison waveform with the first waveform to ascertain the presence of information in the top of the first waveform indicative of flaws in the material.

16. An electronic system for processing a first waveform produced by material inspection equipment to extract information therefrom; said system comprising means for receiving said first waveform and for producing a second waveform having the same general shape as that of the first waveform but modified in respect of sudden transitions in said first waveform and means for comparing said first and second waveforms to produce a signal indicative of said information.

17. In an electronic system for processing a first waveform composed of a series of square-wave pedestals produced by material inspection equipment to extract information contained in the peak levels of the pedestals the improvement comprising:
a low-pass filter with an input for receiving the first waveform and an output producing a comparison waveform from each of the pedestals; means for altering the cut-off frequency of the filter from a higher value to a lower value just after the leading edge of each pedestal has occurred and from the lower value back to the higher value just before the lagging edge of each pedestal has occurred to thereby ensure that the leading and lagging edges of each pedestal are preserved in the associated comparison waveform; and means for comparing each pedestal with its associated comparison waveform to ascertain the presence of said information in the peak level of the pedestal.

18. A method of inspecting materials, said method comprising collecting electromagnetic radiation influenced by the presence of said material;
producing a first electrical waveform from the collected radiation;
deriving a second electrical waveform having the same general shape as that of the first waveform but modified in respect of sudden transitions in said first waveform; and
comparing the first and second waveforms to detect the presence of information in the first waveform indicative of the characteristics of the material under investigation.

19. A method according to claim 18, wherein said second waveform is an analogue waveform with a peak level in pre-determined relationship to the peak level of the first waveform.

20. A method of processing a first waveform composed of a series of square-wave pedestals produced by material inspection equipment to extract information contained in the peak levels of the pedestals; said method comprising producing an analogue comparison waveform from each of the pedestals, the comparison waveform having the same general shape as the associated pedestal with a peak level in pre-determined relationship to the peak level of the associated pedestals but modified in respect of sudden transitions in the top of the pedestal representing said information; and
comparing the comparison waveform with its associated pedestal to detect the presence of said information.

* * * * *